(12) United States Patent
Reyes

(10) Patent No.: US 11,803,821 B2
(45) Date of Patent: Oct. 31, 2023

(54) METHOD FOR DEMANUFACTURING ELECTRONIC DEVICES

(71) Applicant: Sustronics LLC, Longview, TX (US)

(72) Inventor: Jose Reyes, Longview, TX (US)

(73) Assignee: Sustronics LLC, Longview, TX (US)

( * ) Notice: Subject to any disclaimer, the term of this patent is extended or adjusted under 35 U.S.C. 154(b) by 952 days.

(21) Appl. No.: 16/692,230

(22) Filed: Nov. 22, 2019

(65) Prior Publication Data

US 2020/0167739 A1    May 28, 2020

Related U.S. Application Data

(60) Provisional application No. 62/771,033, filed on Nov. 24, 2018.

(51) Int. Cl.

| | | |
|---|---|---|
| *G06Q 10/30* | (2023.01) | |
| *H02J 50/23* | (2016.01) | |
| *H02J 50/27* | (2016.01) | |
| *G06Q 10/20* | (2023.01) | |
| *H04L 67/141* | (2022.01) | |
| *G06F 1/16* | (2006.01) | |
| *G06Q 50/04* | (2012.01) | |

(Continued)

(52) U.S. Cl.
CPC ........... *G06Q 10/30* (2013.01); *G06F 1/1616* (2013.01); *G06F 1/1652* (2013.01); *G06Q 10/20* (2013.01); *G06Q 20/02* (2013.01); *G06Q 20/10* (2013.01); *G06Q 50/04* (2013.01); *H02J 50/23* (2016.02); *H02J 50/27* (2016.02); *H04L 67/12* (2013.01); *H04L 67/141* (2013.01); *H04L 67/51* (2022.05); *H10K 71/00* (2023.02); *H10K 71/861* (2023.02); *H10K 2102/311* (2023.02); *Y02W 30/82* (2015.05)

(58) Field of Classification Search
CPC ..... G06F 1/1616; G06F 1/1652; G06Q 10/20; G06Q 10/30; G06Q 20/02; G06Q 20/10; G06Q 50/04; H01L 2251/5338; H01L 2251/568; H01L 51/56; H02J 50/23; H02J 50/27; H04L 67/12; H04L 67/141; H04L 67/51
See application file for complete search history.

(56) References Cited

U.S. PATENT DOCUMENTS

| | | | |
|---|---|---|---|
| 2011/0199728 A1* | 8/2011 | Reyes | G06F 1/1616 24/442 |
| 2016/0132840 A1* | 5/2016 | Bowles | H04M 1/0287 705/306 |
| 2018/0249584 A1* | 8/2018 | Kim | G09G 3/20 |

* cited by examiner

*Primary Examiner* — Charles J Han
(74) *Attorney, Agent, or Firm* — James A. Sheridan; Sheridan Law, LLC

(57) ABSTRACT

There is disclosed a method for demanufacturing an electronic device in order to minimize an environmental impact. The demanufacturing method may comprise providing a motherboard and a display for manufacturing the electronic device, at least one of which is flexible. The method may further comprise attaching the motherboard and the display to an enclosure having a top portion and a bottom portion and one or more side walls for joining the top and the bottom portions. The method may further comprise the flexible boards or display being peelably removable at the end-of-life. The method may further comprise disposing at least two locking mechanisms on one of the one or more side walls, two of the at least two locking mechanisms being simultaneously releasable with one action of a recycling tool inserted into the two of the at least two locking mechanisms.

18 Claims, 10 Drawing Sheets

(51) Int. Cl.
*G06Q 20/10* (2012.01)
*G06Q 20/02* (2012.01)
*H04L 67/12* (2022.01)
*H04L 67/51* (2022.01)
*H10K 71/00* (2023.01)
*H10K 102/00* (2023.01)

METHOD FOR DEMANUFACTURING ELECTRONIC DEVICES

CROSS REFERENCE TO RELATED APPLICATIONS

This patent application claims priority to U.S. Provisional Application No. 62/771,033 filed on Nov. 24, 2018 and entitled SUSTAINABLE ELECTRONIC DEVICES, the entire contents of Application 62/771,033 being expressly incorporated by reference herein.

BACKGROUND

Billions of pounds of electronic waste (e-waste) are generated annually from electronic devices that fail or that reach an end-of-life, from the perspective of their operators, and often wind up in landfills or dumped in the ocean. Although a vast array of electronic devices are produced inexpensively, the appeal and features of next generation products quickly render the devices obsolete. Furthermore, the permanent fasteners and component integration used in manufacturing the devices discourage repair and prevent demanufacturing down to the component level. Also, a lack of repair and recycling information means that many end-of-life devices end up stockpiled in the closets and basements of their owners.

An example of permanent fastening and component integration is the liquid crystal display (LCD) sometimes used in electronic devices such as a laptop computer, and which contain multiple rigid layers, included glass. The display is often bonded to a frame of the device enclosure with glues or otherwise bonded, and the integrated assembly makes it difficult or impossible to separate out recyclable elements or to replace the display. Also, the light emitting diode (LED) and LCD displays used in electronic devices use substantial electrical power to operate, thereby requiring a corded power supply made of metal wiring and plastic sheathing, both elements placing a demand on natural resources.

One solution to e-waste has been the availability of community recycling centers. Also, e-waste applications (Apps) exist which provide a directory of drop-off locations and recycling organizations. Unfortunately, recycling drop-off is a one-way, non-interactive process, and does not facilitate repair or refurbishing of obsolete devices, nor a more sophisticated scrapping of valuable components such as gold or still-working components. Only 15-20% of e-waste is recycled, resulting in heavy metals and other toxins being diverted into the air, water, and land, impacting future generations' ability to meet their basic needs.

SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In an embodiment, there is disclosed a method for demanufacturing an electronic device in order to minimize an environmental impact and to facilitate a repair, refurbishing, or recycling of the electronic device at an end-of-life. The demanufacturing method may comprise providing a motherboard and a display for manufacturing the electronic device, where at least one of the motherboard and the display are flexible. The method may further comprise enclosing the motherboard within and attaching the display to an enclosure having a top portion and a bottom portion and one or more side walls for joining the top and the bottom portions. The method may further comprise at least one of the motherboard and the display being removable from the enclosure by peeling off at the end-of-life of the electronic device. The method may further comprise disposing at least two locking mechanisms on one of the one or more side walls, two of the at least two locking mechanisms being simultaneously releasable with one action of a recycling tool inserted into the two of the at least two locking mechanisms. The method may further comprise locking the top portion to the bottom portion with the at least two locking mechanisms, thereby completing the enclosing.

In another embodiment, there is disclosed a method for demanufacturing an electronic device in order to minimize an environmental impact and to facilitate the repair, refurbishing, or recycling of the electronic device. The method may comprise providing a motherboard and a display for manufacturing the electronic device, and may further comprise attaching and enclosing the motherboard and the display to an enclosure. The enclosure may have a top portion and a bottom portion and one or more side walls joining the top and the bottom portions. At least one of the motherboard and the display may attach to the enclosure by one or more guides of the enclosure and be slidably removable at an end-of-life of the electronic device. The method may further comprise disposing at least one locking mechanism on one of the one or more side walls, the at least one locking mechanism being releasable with one action of a recycling tool inserted into the at least one locking mechanism. The top portion may be locked to the bottom portion with the at least one locking mechanisms, thereby completing the enclosing. The method may further comprise making available at least one of demanufacturing instructions and the recycling tool for the demanufacturing of the device.

Yet another embodiment may comprise exchanging one or more components of an end-of-life electronic device between a device operator owning or operating the electronic device and a network of entities in order to recycle device scrap or to extend the life of the electronic device. The method may comprise initiating a logical session between the device operator and an application server, and may further comprise receiving from the device operator a request for information on one or more of a demand for a scrap article of the end-of-life electronic device, a list of refurbishers, a list of recycling entities, and a price and availability of a repair component. The method may further comprise accessing databases connected to the application server to retrieve the information arriving from at least one of the following entities communicative with the application server: a salvage dealer, a refurbisher, a recycling entity, and a component supplier. The method may further comprise transmitting to the device operator the information retrieved.

Additional objects, advantages and novel features of the technology will be set forth in part in the description which follows, and in part will become more apparent to those skilled in the art upon examination of the following, or may be learned from practice of the technology.

BRIEF DESCRIPTION OF THE DRAWINGS

Non-limiting and non-exhaustive embodiments of the present invention, including the preferred embodiment, are described with reference to the following figures, wherein like reference numerals refer to like parts throughout the various views unless otherwise specified. Illustrative embodiments of the invention are illustrated in the drawings, in which.

DETAILED DESCRIPTION

Figure 1B:
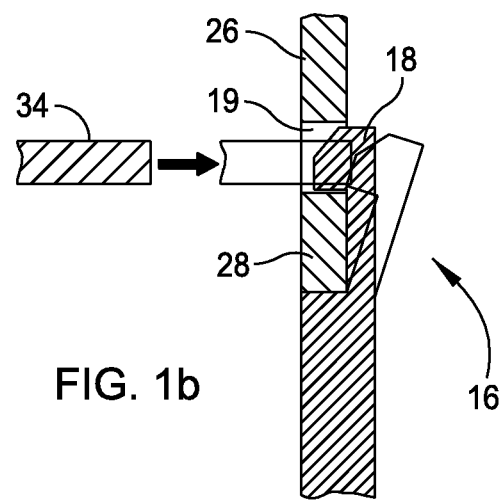
FIG. 1b illustrates a cutaway view of the locking mechanism of FIG. 1a, in accordance with an embodiment of the present disclosure.

Embodiments are described more fully below in sufficient detail to enable those skilled in the art to practice the system and method. However, embodiments may be implemented in many different forms and should not be construed as being limited to the embodiments set forth herein. The following detailed description is, therefore, not to be taken in a limiting sense.

When elements are referred to as being "connected" or "coupled," the elements can be directly connected or coupled together or one or more intervening elements may also be present. In contrast, when elements are referred to as being "directly connected" or "directly coupled," there are no intervening elements present.

As may be appreciated, based on the disclosure, there exists a need in the art for a method of designing, manufacturing, and demanufacturing an electronic device such that it can be easily disassembled for the repair, refurbishing, recycling, or scrapping of its useful elements when it has failed or become obsolete. Further, there exists a need in the art for extending the lifetime of the electronic device and recovering the useful elements such that the manufacturing of said devices moves in the direction of environmental sustainability. In addition, there exists a need in the art for facilitating a 2-way exchange among parties interested in extending device lifetime and recovering the useful elements.

In an embodiment, referring to FIGS. 1a-1b, 2, 4a, and 6, a method for demanufacturing an electronic device 10 is described for minimizing an environmental impact and to facilitate a repair, refurbishing, or recycling of the electronic device 10 at an end-of-life. The electronic device may be a laptop computer, a smart phone, a tablet, a camera, an Internet of Things device, a television, a gaming device, and a smart watch. The method may comprise providing an internal component 15 and a display 14 for manufacturing the electronic device 10. The internal component 15 may be a motherboard 12 (FIG. 4a), one or more batteries (not shown) for powering the motherboard, a wireless power receiver for charging the one or more batteries, a shielding enclosure, an input/output device, a hard drive, or a memory.

At least one of the component 15 and the display 14 may be flexible such that they may be peelably removable from the enclosure by peeling off at the end-of-life of the electronic device. The method may further comprise enclosing the component 15 within and attaching the display 14 to an enclosure 20 having a top portion 22 and a bottom portion 24 and one or more side walls 26, 28 for joining the top 22 and the bottom 24 portions. Upper side wall 26 and lower side wall 28 may be extensions of top portion 22 and bottom portion 24, respectively, and may be configured to directly join top portion 22 to bottom portion 24 in order to assemble the enclosure 20. Alternatively, side walls 26 and 28 may be separate pieces linkable to the top 22 and the bottom 24 portions, respectively, for completing the enclosure 20.

Figure 1A:
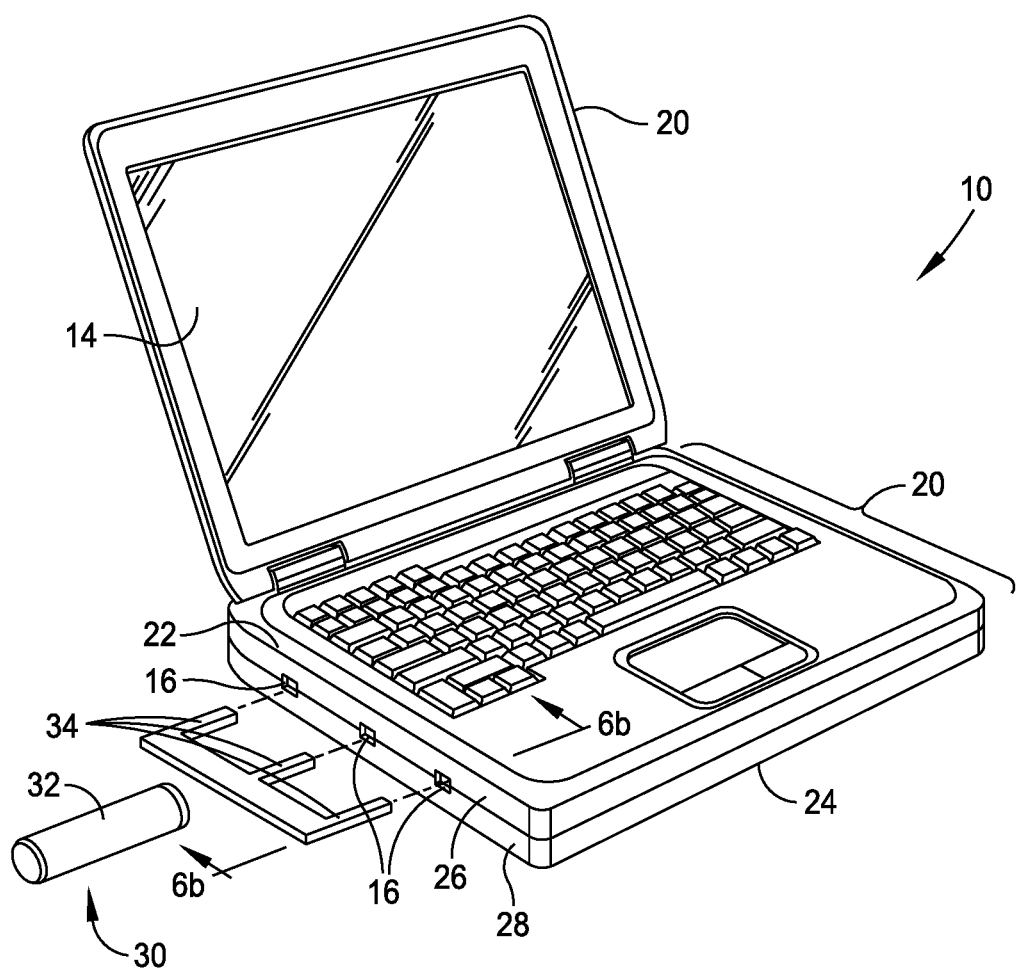
FIG. 1a illustrates a perspective view of an electronic device with locking mechanisms releasable by a recycling tool, in accordance with an embodiment of the present disclosure.
Figure 2:
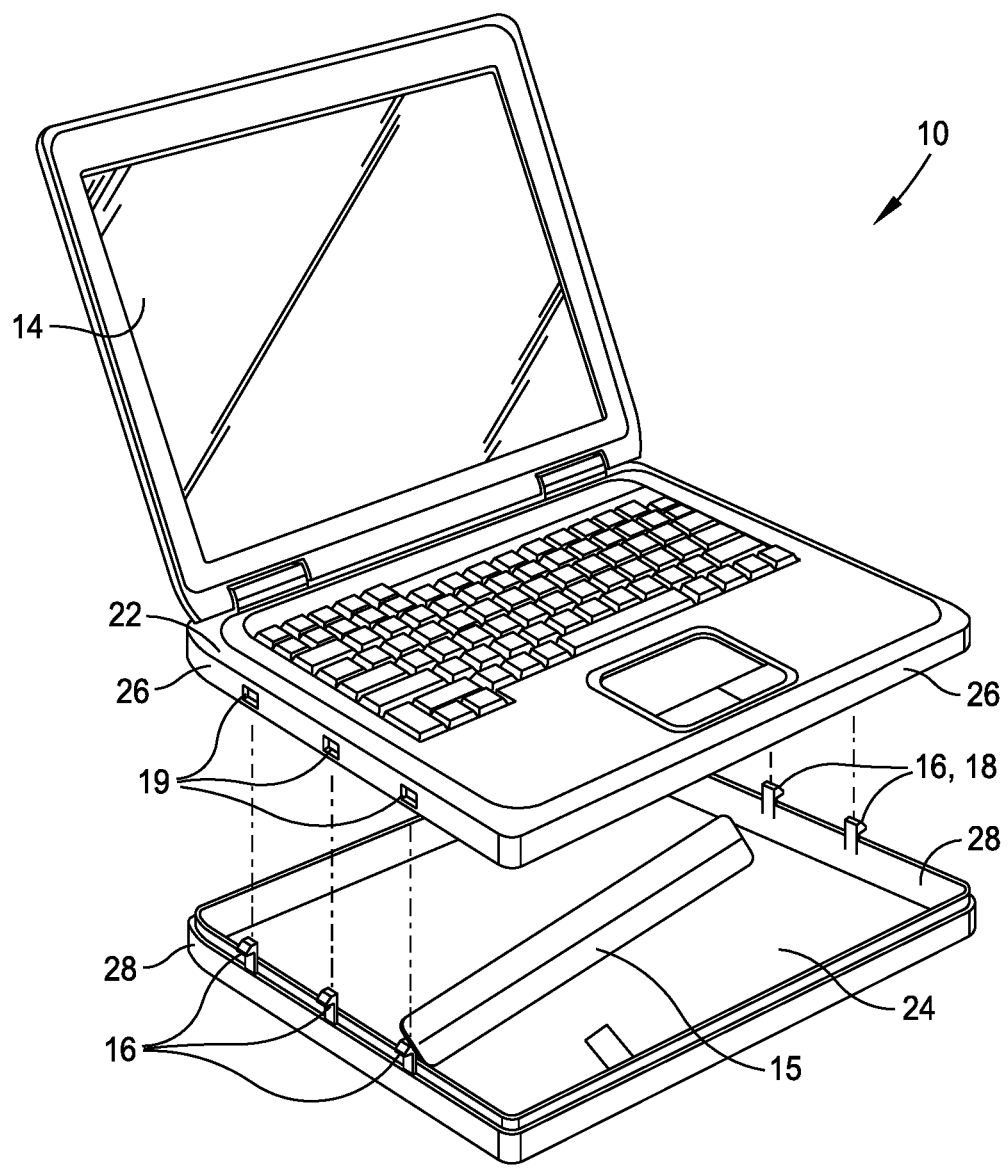
FIG. 2 illustrates a perspective view of an upper and a lower portion of an enclosure of the electronic device of FIG. 1a, in accordance with an embodiment of the present disclosure.

Continuing with FIGS. 1a-1b and 2, at least two locking mechanisms 16 may be disposed on one of the one or more side walls 26, 28 for locking the top 22 and the bottom 24 portions together. The locking mechanism 16 may comprise a hook receptacle 19 disposed on top portion 22 and a mechanism hook 18 complementary to the hook receptacle 19 and disposed on the bottom portion 24. Mechanism hook 18 may cantilever out from hook receptacle 19, as shown in FIG. 1b, during latching and unlatching of the locking mechanism 16. Alternatively, the hook 18 may be disposed on top portion 22 with the receptacle 19 disposed on bottom portion 24. In other embodiments, there may be only one locking mechanism 16 disposed on one or more of the one or more side walls 26, 28. Two or more locking mechanisms 16 may alternatively be disposed on two or more of side walls 26, 28.

Referring to FIGS. 1a-1b, in one embodiment, three of the locking mechanisms 16 on a side wall may be simultaneously releasable by one action of the prongs 34 of a recycling tool 30 inserted into locking mechanisms 16. In other embodiments, at least two of the locking mechanisms 16 on a side wall may be simultaneously releasable by one action of the recycling tool 30. Recycling tool 30 may assist in rapidly disassembling enclosure 20 by a pushing action from handle 32 pressing prongs 34 into hook receptacles 19. Advantageously, the pushing action of tool 30 avoids a repetitive unscrewing action of an enclosure locked together by screws, and avoids prying apart an enclosure 20 that has been glued or snapped together. In other embodiments, recycling tool 30 may have one prong, or may have two or more prongs for simultaneously releasing locking mechanisms 16.

In embodiments not shown, each locking mechanism 16 may comprise a tab, a magnet, a fingerprint sensor, a pin, a snap-lock mechanism, a press-fit mechanism, a bracket-type mechanism, a slide-and-lock mechanism, a twist-and-lock or other friction-fit mechanism, a frequency-triggered release mechanism, a tongue-and-groove mechanism, a buckle mechanism, a joint, a hinge, or any other suitable mechanism for securing the top and bottom portions in a way releasable with one action of the recycling tool 30. Advantageously, the use of a push release, single-action locking mechanism and tool may alleviate the risk of worker injury, such as carpal tunnel syndrome arising from repetitive hand and wrist actions.

Figure 3A:
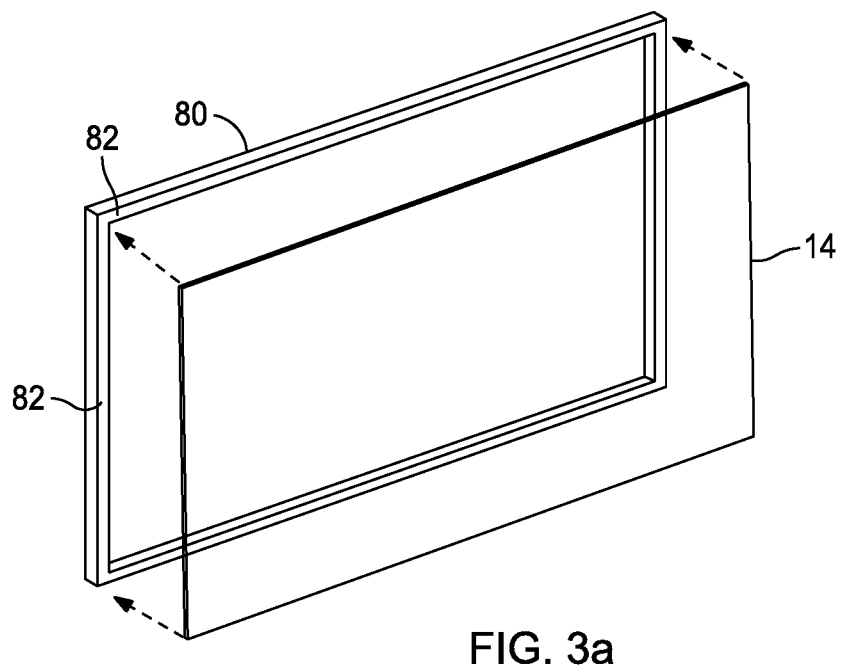
FIGS. 3a and 3b illustrate a perspective view of a peelable display mountable to a frame of the enclosure of the electronic device, in accordance with an embodiment of the present disclosure.
Figure 3B:
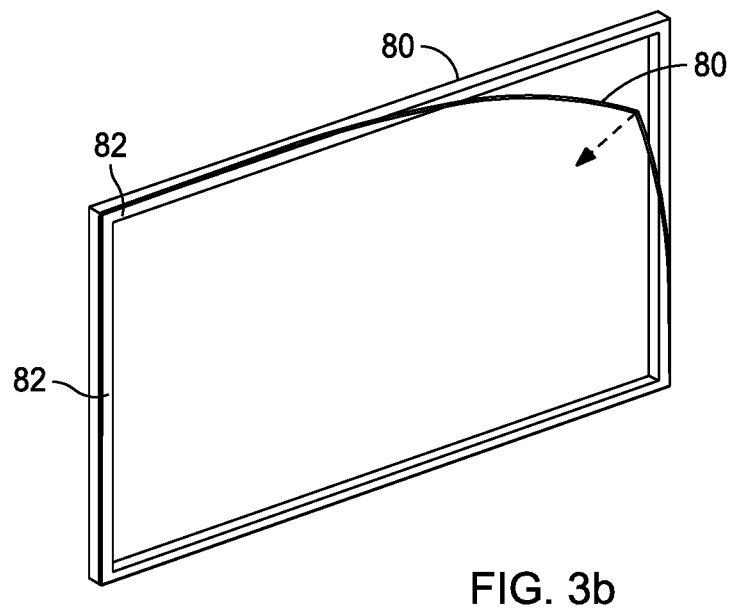

Referring now to FIG. 3a-3b, in an embodiment, display 14 may be flexible, and may be peelably attached to display frame 80 at contact surface 82 (FIG. 3a) using one or more of a hook-and-loop fastener, a heat-sealable fabric, a resilient glue, and mechanical snaps. Display 14 may be peeled off from contact surface 82 (FIG. 3b) during demanufacturing, and may be replaced with a new display, or may be recycled. Display frame 80 may be connected to the enclosure 20 via a hinge, such as for a laptop computer or related device, or may be part of or internal to enclosure 20 of the electronic device 10. Alternatively, display frame 80 with contact surface 82 may be integral to the enclosure 20 and may be isolated in FIGS. 3a-b only for the purpose of defining contact surface 82.

Continuing, in various embodiments, display 14 may be an organic light-emitting diode (OLED) display, and the OLED display may be flexible for peelably attaching to enclosure 20 or to display frame 80 for easy repair or recycling. The OLED may be built from organic electroluminescent materials resulting in a display that may be thinner and lighter than an LED or LCD, and may therefore be flexible to facilitate peelable attaching. Because individual pixels of the OLED can be shut off to provide an absolute black, they may have lower power consumption and thereby facilitate a smaller power supply (not shown) for the electronic device. Display 14 may also be a light-emitting polymer (LEP), or may be a flexible organic light-emitting diode (FOLED) having a flexible plastic substrate.

Figure 4A:
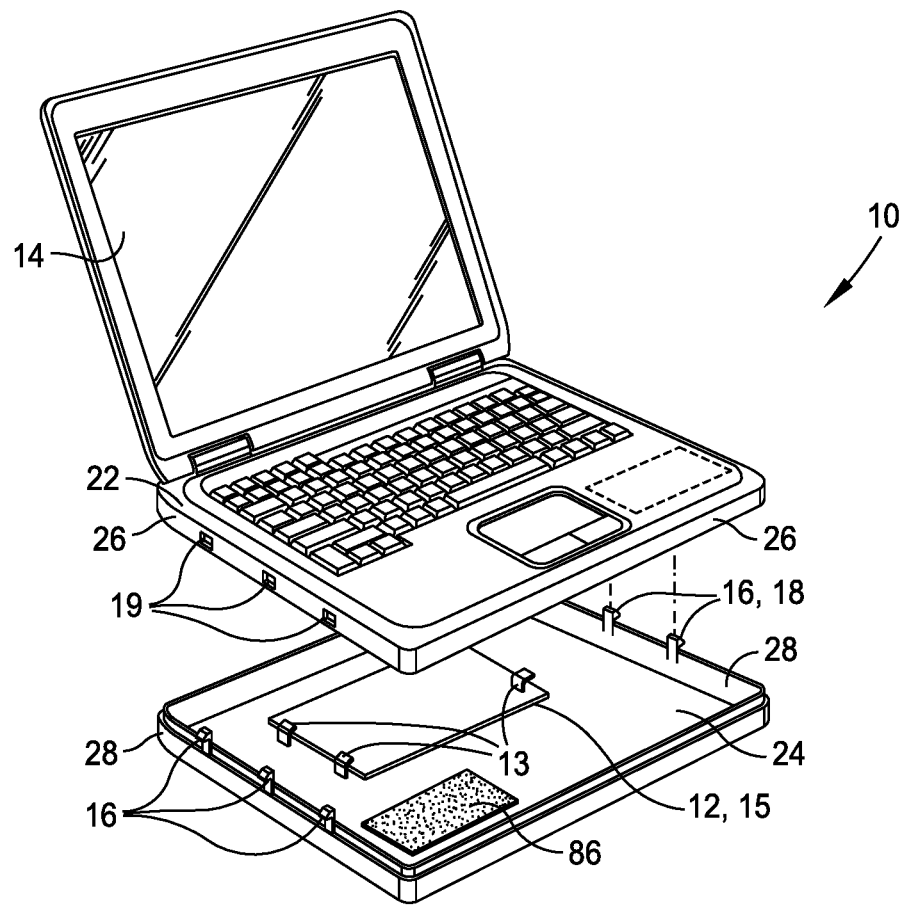
FIGS. 4a and 4b illustrate a perspective view of a hook-and-loop fastener for mounting internal components to the enclosure of the electronic device, in accordance with an embodiment of the present disclosure.
Figure 4B:
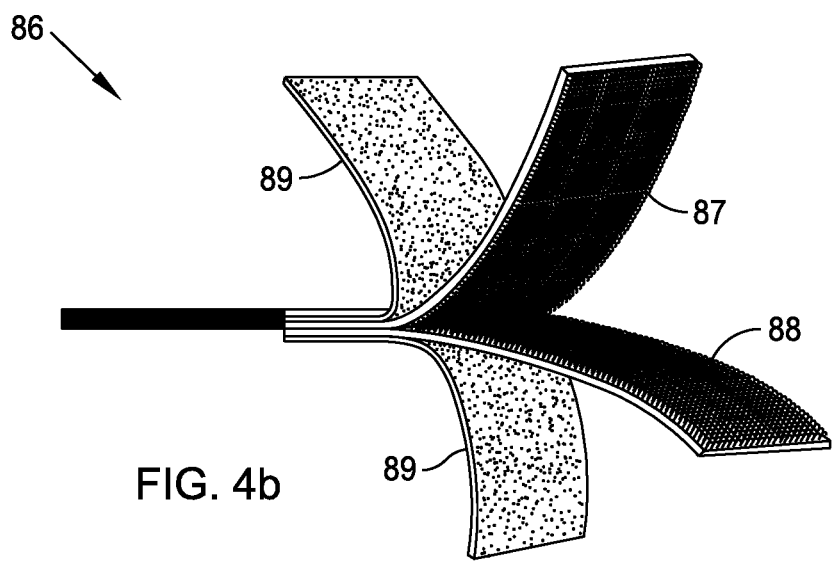

Referring now to FIG. 4a-4b, in various embodiments, motherboard 12 may attach to enclosure 20 by one or more guides of the enclosure 20 and may be slidably removable at the end-of-life of the electronic device. The one or more guides may comprise guide tabs 13 or one or more of a guide rail (not shown). Guide tab 13 may be an L-shaped hook or tab for cupping an edge of the motherboard 12. Motherboard 12 may be rigid, such as an FR4 epoxy printed circuit board. Guides 13 provide for quick demanufacturing and/or repair of electronic device 10.

In alternative embodiments, motherboard 12 may be flexible for peelable attachment to enclosure 20 using one or more of a hook-and-loop fastener, a heat-sealable fabric, a resilient glue, and mechanical snaps, or other quick-release non-damaging fastener. Glue may be resilient if it retains its elasticity or stickiness for months or years after attachment, such as various tearable rubbery adhesives, or such as 3M's Photomount™ product. Hook-and-loop fastener 86 may comprise hooking pad 87, looping pad 88 removably attachable to hooking pad 87, and an upper and lower layer of adhesive 89 for adhering one to the enclosure 20 and the other to the component 15 being mounted. Other internal components 15 may be peelably attachable to enclosure 20 for quick demanufacturing and may include one or more batteries for powering the motherboard, a wireless power receiver for charging the one or more batteries, a shielding enclosure, an input/output device, a hard drive, a processor, a memory, and a heat sink.

Figure 5:
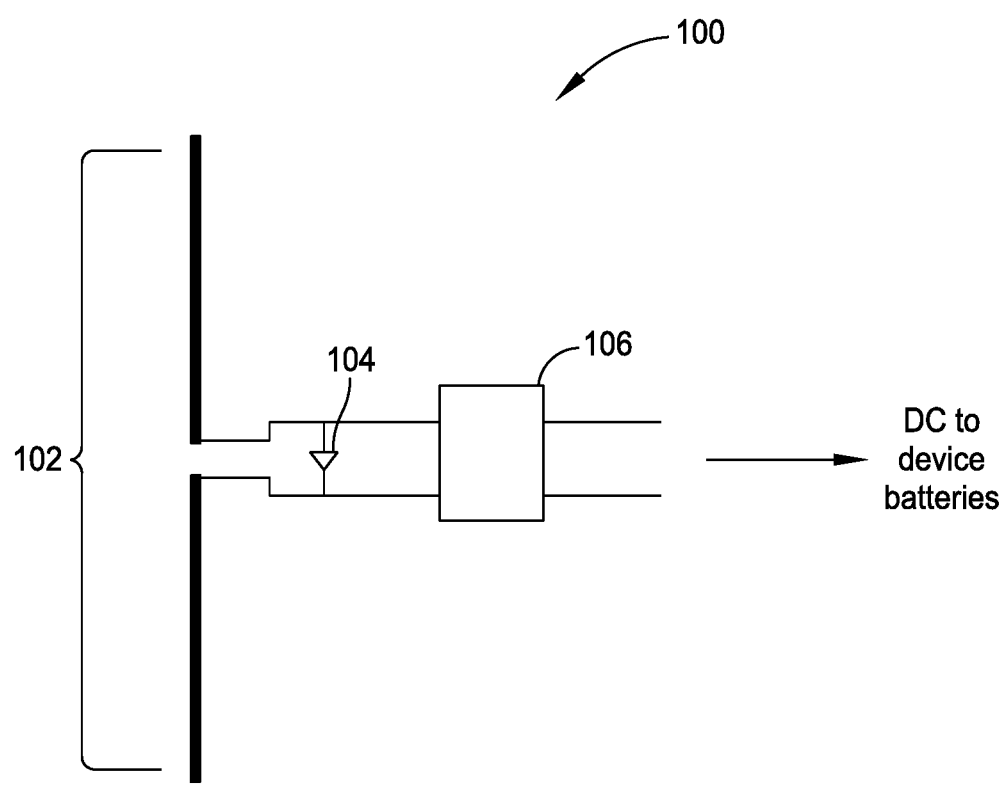
FIG. 5 illustrates a schematic of a wireless power receiver, in accordance with an embodiment of the present disclosure.
Figure 6:
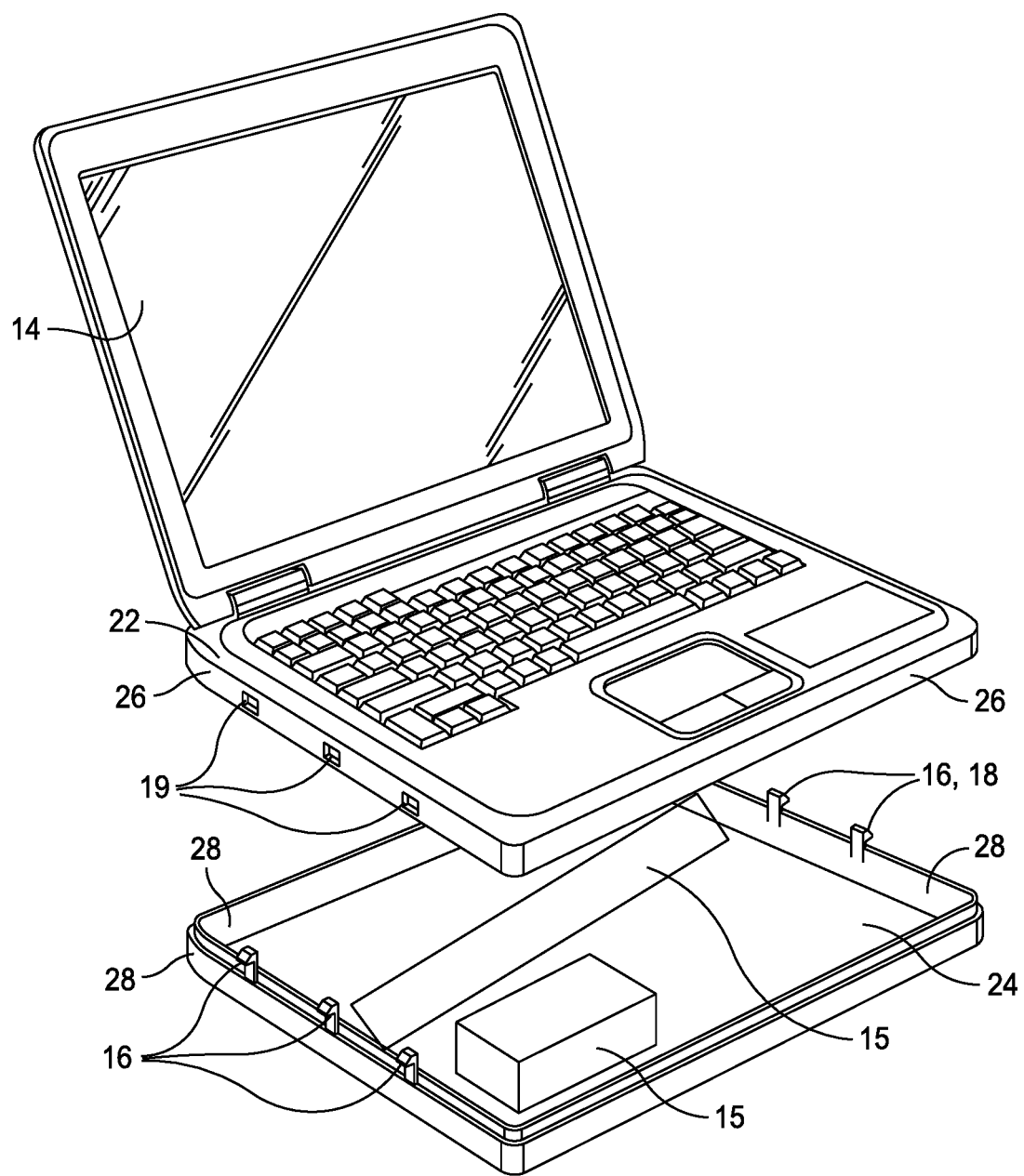
FIG. 6 illustrates a perspective view of internal components of the electronic device, in accordance with an embodiment of the present disclosure.

Referring now to FIG. 5, in an embodiment, the method for demanufacturing the electronic device 10 may also comprise providing one or more batteries (not shown) within the enclosure 20 for powering the motherboard 12, and may further comprise providing a wireless power receiver 100 connectable to the one or more batteries for charging from an RF source (not shown) remote from the electronic device 10. The one or more batteries and the wireless power receiver 100 may each be represented as component 15 depicted in FIG. 6, and may peelably or slidably attachable to enclosure 20. Wireless power receiver 100 may comprise a rectenna comprising an antenna 102 feeding a rectifying circuit 104 and 106 capable of providing DC power to the one or more batteries.

The RF source may be one of a WiFi router and a directional wireless charging transmitter configured to communicate with the wireless power receiver 100. Electronic device 10 may be equipped with a locator chip (not shown) communicative with the directional charging transmitter, and may facilitate wirelessly charging the electronic device at distances much greater than may typically be encountered with the wireless chargers made for electric toothbrushes and smart phones. The locator chip may send out a beacon signal receptive by the charging transmitter. The directional charging transmitter may determine the propagation paths emanating from the locator chip, or otherwise determine the location of the electronic device, and may then concentrate power to the wireless power receiver 100 for charging the electronic device 10. Beneficially, an electronic device using an OLED display and other reduced power methods may derive adequate power for partially or completely charging an electronic device 10 from the wireless power receiver 100.

Referring again to FIGS. 1a-1b, in various embodiments, the method for demanufacturing may further include, once all internal components have been mounted to enclosure 20, completing the assembly of the electronic device 10 by locking the top portion 22 to the bottom portion 24 with locking mechanisms 16, thereby completing the enclosing process. The method may further include making available at least one of demanufacturing instructions and the recycling tool 30 for demanufacturing (disassembling) the device 10. Demanufacturing instructions may be one or more of information describing how to use the recycling tool, schematics or mechanical drawings useful to an entity repairing or recycling the electronic device, and contact information for repair or recycling entities.

The recycling tool and/or demanufacturing instructions may be made available to repair entities approved by the manufacturer or to all buyers and/or operators of the electronic device. Approved entities may be internal to the manufacturer, or may be designated or approved repair or recycling entities external to the manufacturer.

A motherboard may be defined as including a primary electrical circuit, circuit board, and/or integrated circuit necessary for the primary function of the electronic device. For example, the motherboard for a laptop computer may include a processor and memory for executing the operating software and driving the display of the computer. A flexible motherboard may be constructed on thin, lightweight substrates that minimize material usage, production cost, and carbon dioxide emissions during manufacturing, thereby promoting sustainability. A flexible motherboard may be bent, stretched, or folded, and may thereby facilitate non-planar enclosures (component 15 in FIG. 2) that minimize material usage or are curved. Flexible boards may be printed on plastic or rubber film. Examples of plastic film may be polyimide polymers (e.g. commercial product Kapton) or fluoropolymers like Teflon.

The top 22 and the bottom 24 portions of enclosure 20 may be made of metal, metal alloys, or plastic or a combination such as are well-known in the art. For example, a plastic top or bottom portion may be made of thermoplastic, resin, polymer, or combinations thereof. The mechanism hook 18 and receptacle 19 may be conductive or coated with a conductive film for electrically connecting the top and bottom portions of the enclosure, and may thereby provide RF shielding for the enclosure 20.

The hook-and-loop fasteners 87 and 88 used to attach one or more internal components 15 to enclosure 20 may include conductive material (not shown) for electrically connecting the one or more internal component to the enclosure. For example, the hook-and-loop fasteners 87 and 88 may be made of or coated with the conductive material. Internal component 15 may include a conductive shield for attenuating radio emissions emanating from or radiating into the internal component 15. The conductive shield may comprise a metallic enclosure (not shown) around part or all of circuitry of the internal component 15, and the conductive shield may then be electrically connected to the enclosure 20 by the conductive hook-and-loop fastener. The device 10 may also include one or more electromagnetic interference (EMI) gaskets operably connected to at least one of the top portion 22, the bottom portion 24, the upper side wall 26, and the lower side wall 28 of the enclosure 20. The one or more EMI gaskets may be a flexible conductive plastic or metal and may be sandwiched between internal component 15 and the enclosure 20, or may be sandwiched between two of portions 22 and 24 and side walls 26 and 28.

Figure 7:
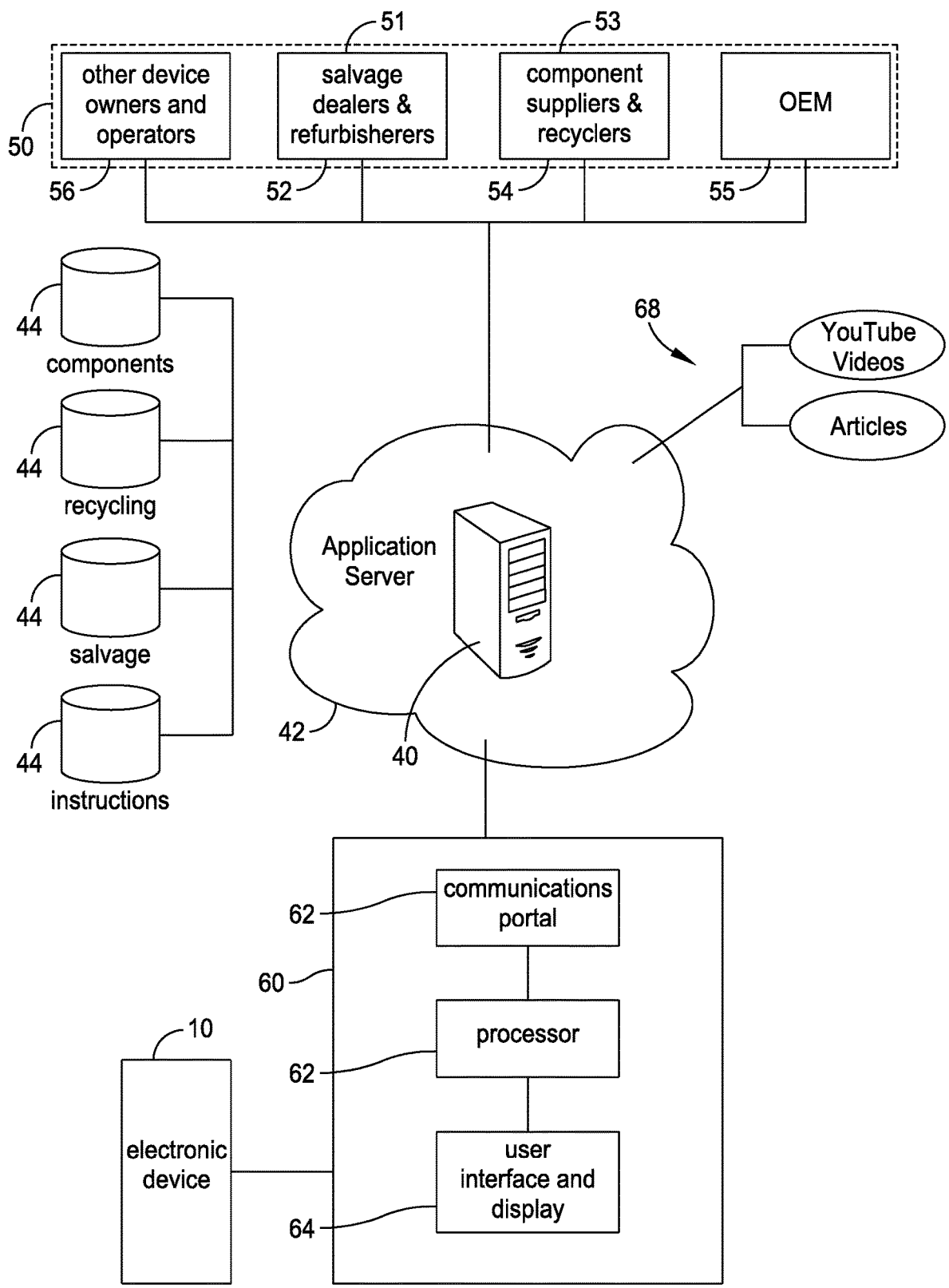
FIG. 7 illustrates a network diagram of an end-of-life application for exchanging one or more components of the electronic device, in accordance with an embodiment of the present disclosure.
Figure 8:
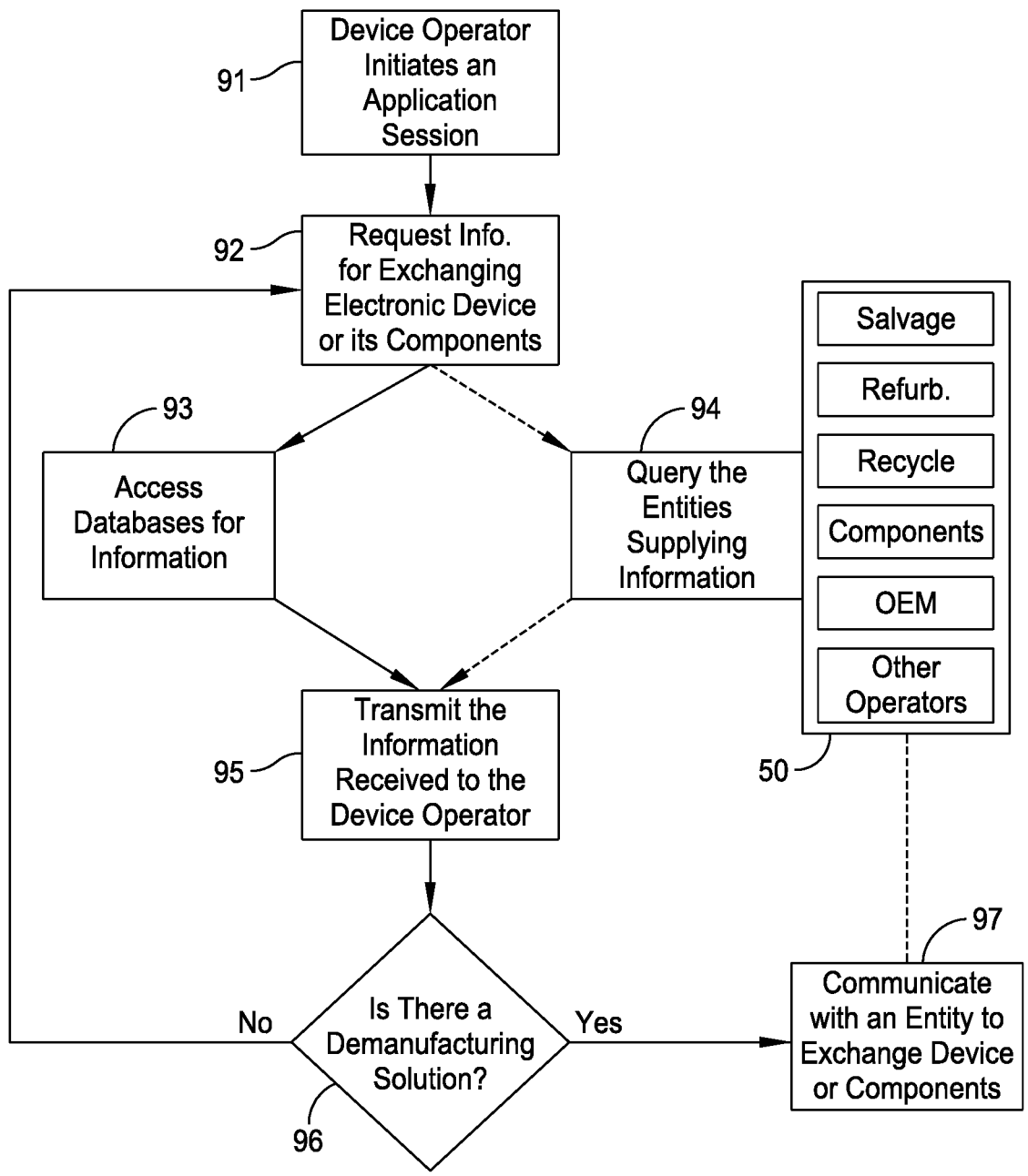
FIG. 8 illustrates a logic diagram for the end-of-life application of FIG. 7, in accordance with an embodiment of the present disclosure.

Referring now to the network diagram of FIG. 7 and the logic diagram of FIG. 8, in various embodiments, there is described a method for exchanging one or more components of an end-of-life electronic device 10 between a device operator owning or operating the electronic device and a network of entities 50 in order to recycle device scrap of the end-of-life electronic device or to extend the life of the device.

The exchange method may comprise initiating 91, through an executable end-of-life application, a logical session between the device operator and an application server 40 accessible through the internet 42. The executable application may be installed on a processor 62 of a communication device 60 of the device operator and may access the application server 40 via a communication portal 66 connected to the internet 42. The processor 62 may drive a user interface and display 64 for interacting with the device operator. Alternatively, the executable application may be integrated into or installed on the electronic device 10 itself, or may be integrated into the motherboard of the device. Advantageously, including the application in the electronic device itself installs longevity and sustainability into the device, and may be installed at the point of manufacture. Communication portal 66 may be an internet modem, WiFi router, cellular transceiver, or other means commonly used to access the internet.

The exchange method may further comprise receiving from the device operator a request 92 for information regarding one or more of a demand for a scrap article of the end-of-life electronic device, a list of refurbishers, a list of recycling entities, and a price and availability of a repair component. The method may further comprise accessing 93 databases 44 connected to the application server 40 to retrieve the information arriving from at least one of the following entities communicative with the application server 40: a salvage dealer, a refurbisher, a recycling entity, and a component supplier.

The executable application may periodically receive from the entities 50 communicative with the server 40 and from communication device 60 of the device operator an update of supply and demand values of the one or more components for a set of makes and models of the electronic device supported by the databases 44 connected to the application server 40. The values may include price and availability. The entities 50 communicative with the application server 40 may also include at least one of an original equipment manufacturer (OEM) supplier 55 and other device operators 56. The exchange method may also comprise querying 94 the entities directly to fulfill the information request 92.

Finally, the method may include transmitting 95 to the device operator the information retrieved, where the requested information may be retrieved directly or indirectly from the network of entities 50. The method may further comprise deciding 96 whether there is an actionable demanufacturing solution, based on the information retrieved. If there is an actionable solution, the method may further comprise communicating 97 with one or more of the entities to transfer (exchange) one or more components of the end-of-life device. The component transfer may comprise a reciprocal transacting of funds through the application server in order to complete the exchange of the one or more components.

Continuing with FIGS. 7 and 8, the databases 44 connected to the application server 40 may include demanufacturing instructions for at least one of disassembling, scrapping, recycling, and refurbishing the electronic device, and the request 92 for information may include the demanufacturing instructions. The demanufacturing instruction may include pointing to education links 68 including one or more of YouTube videos, articles, and OEM and component supplier price and availability data. If the deciding 96 determines that there is not an actionable demanufacturing solution, the method may further include requesting 92 different information or the same information at a later time.

Beneficially, users of the executable application may quickly assess demanufacturing options through a transparent exchange of information between one or more of the device operators, the salvage dealer, the refurbisher, the recycling entity, the component supplier, and the OEM. Once distributed to a sufficiently large number of users, the end-of-life application provides an impetus to move millions of end-of-life electronic devices stored, for example, in closets and basement into a commercial stream of entities communicative with the application server executing one or more of scrapping, recycling, refurbishing, repair, manufacturing, and retail exchange.

The end-of-life application may include an account setup and login routine to generate the network of entities and to thereby facilitate an economic exchange currently not available in the demanufacturing and recycling environment. Some electronic devices may become obsolete, from the perspective of their owners or operators, because their appearance becomes marred. These marred or obsolete devices may have utility in other markets, or may be upgraded by refurbishers (remanufacturing) to be attractive and renewed in performance. Refurbishers may include non-profits who resell the electronic devices essentially unchanged to markets where the end-of-life devices are viewed as attractive in their appearance and modern in their performance.

Demanufacturing most directly may comprise the partial or complete disassembling of the electronic device into its basic internal components and subassemblies within or disposed on the enclosure, and may be a first step to repair, refurbishing, or recycling. A method for demanufacturing may also include design and manufacturing steps and elements that facilitate or expedite the repair, refurbishing, or recycling of the electronic device, and whose steps and elements may minimize the natural resources consumed and pollution released into the environment. Establishing a 2-way network of exchange of device components and demanufacturing instructions, through the end-of-life application, may extend the life of the electronic device and dramatically reduce e-waste, and may thereby inject a new ethos of design-for-sustainability into the electronic devices market.

Figure 9:
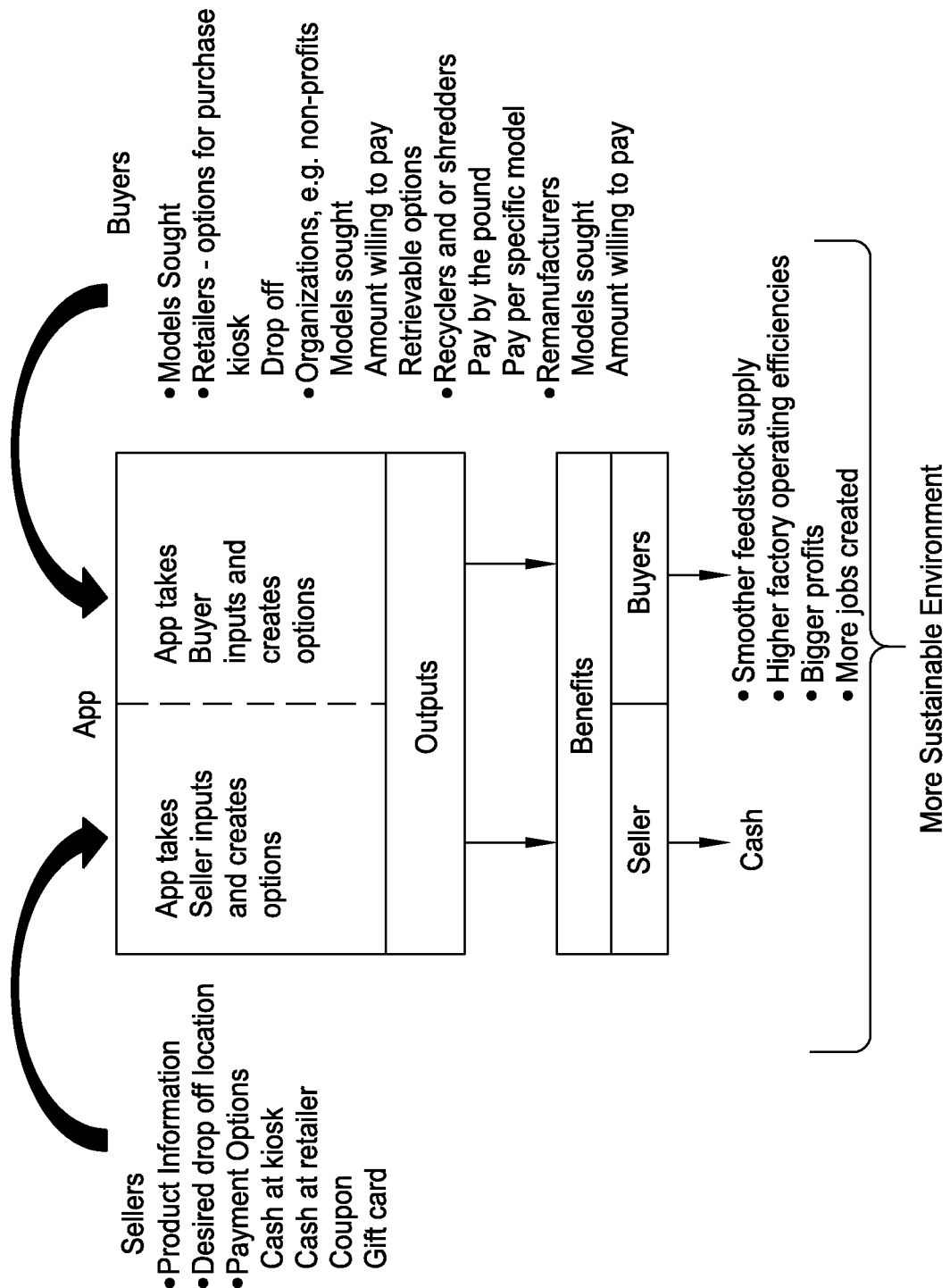
FIG. 9 illustrates an activity flow of the end-of-life application, in accordance with various embodiments of the present disclosure.

FIG. 9, in one embodiment, illustrates activities for any user of the end-of-life application which may include the device operators, the salvage dealer, the refurbisher, the recycling entity, the component supplier, and the OEM. The application may comprise receiving seller inputs (or values) from a user selling any component or an entire device, the values comprising one or more of a sold product description, product make and model, an available quantity, a selling price, a seller drop-off location, and payment instructions. The application may further comprise receiving buyer inputs (values) from any user seeking to buy any component or the entire device, the values comprising the make and models sought, a quantity sought, the selling organization being sought, a buyer drop-off location, an offered price, and payment instructions. The benefits of such an application network include a flow of cash, increased manufacturing efficiencies, and a levelized feedstock of components and working devices.

Figure 10:
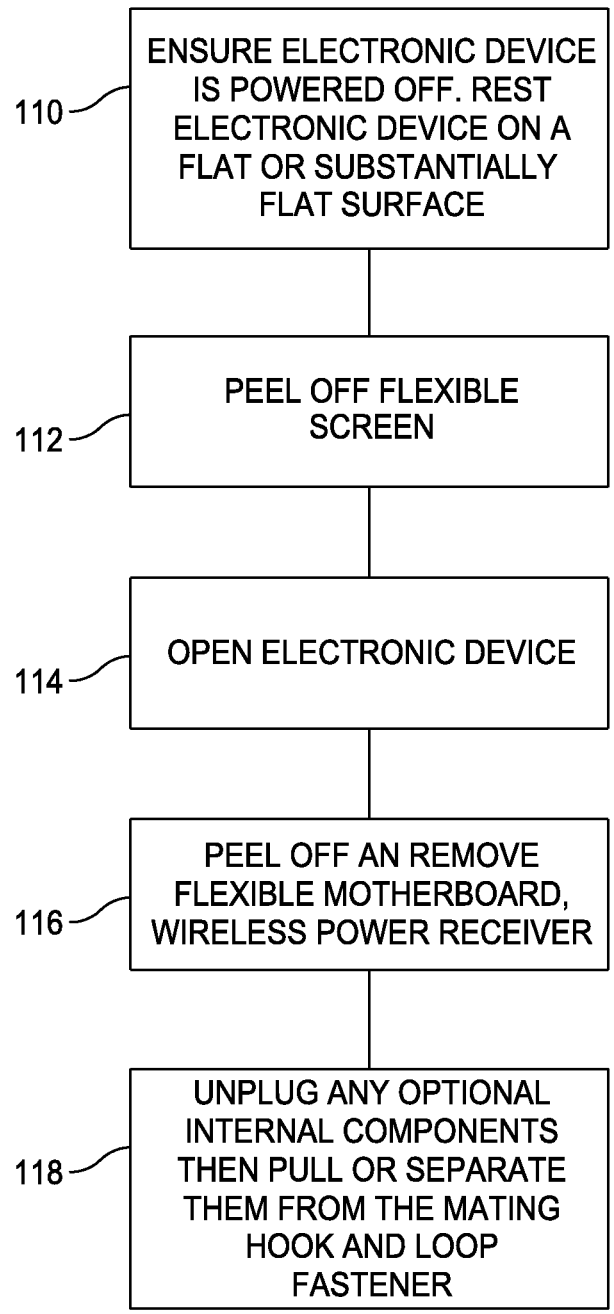
FIG. 10 illustrates a demanufacturing procedure for the electronic device, in accordance with one embodiment of the present disclosure.

Referring now to FIG. 10, in one embodiment, a process for demanufacturing the electronic device may comprise 110 powering off the device and laying it flat for disassembly, peeling off 112 the flexible screen 14 if attached to the outside of the enclosure 20, and opening 114 the electronic device. The demanufacturing process may further comprise peeling off 116 one or more of a flexible motherboard, the wireless power receiver, and any other peelable internal component. The method may further comprise unplugging any internal component mounted by a hook-and-loop fastener.

Although the above embodiments have been described in language that is specific to certain structures, elements, compositions, and methodological steps, it is to be understood that the technology defined in the appended claims is not necessarily limited to the specific structures, elements, compositions and/or steps described. Rather, the specific aspects and steps are described as forms of implementing the claimed technology. Since many embodiments of the technology can be practiced without departing from the spirit and scope of the invention, the invention resides in the claims hereinafter appended.

What is claimed is:

1. A method for demanufacturing an electronic device in order to minimize an environmental impact and to facilitate a repair, refurbishing, or recycling of the electronic device at an end-of-life, the method comprising:
providing a motherboard and a display configured to manufacture the electronic device, where at least one of the motherboard and the display are flexible;
enclosing the motherboard within an enclosure and attaching the display to the enclosure having a top portion and a bottom portion and one or more side walls configured to join the top and the bottom portions, the at least one of the motherboard and the display configured to removed by peeling from the enclosure;
disposing at least two locking mechanisms on one of the one or more side walls, two of the at least two locking mechanisms configured to simultaneously release by one action of a recycling tool configured to insert into the two of the at least two locking mechanisms; and
locking the top portion to the bottom portion with the at least two locking mechanisms, thereby completing the enclosing; and
accessing an application server from a communications device of an operator of the electronic device, the communications device having a processor for operating an end-of-life application installed on the processor and providing internet connectivity to the application server, the end-of-life application capable of one or both of driving a user interface configured to access a set of demanufacturing instructions integrated into the electronic device at original manufacture and the demanufacturing instructions configured to provide disassembly steps to disassemble the electronic device into separate components.

2. The method of claim 1, further comprising:
peelably attaching the at least one of the motherboard and the display using one or more of a hook-and-loop fastener, a heat-sealable fabric, a resilient glue, and mechanical snaps.

3. The method of claim 1, wherein:
the display is a flexible OLED display.

4. The method of claim 1, wherein:
the processor and the end-of-life application are integrated into the motherboard of the electronic device.

5. The method of claim 1, further comprising:
providing one or more batteries within the enclosure configured to power the motherboard and a wireless power receiver configured to connect to the one or more batteries configured to charge from an RF source remote from the electronic device.

6. The method of claim 5, wherein:
the RF source is one of a WiFi router and a directional wireless charging transmitter.

7. The method of claim 5, wherein:
the wireless power receiver is a rectenna comprising an antenna and a rectifier circuit capable of providing DC power.

8. The method of claim 1, wherein:
the locking mechanism comprises a hook receptacle and a mechanism hook latchable to the hook receptacle when locking the enclosure, the mechanism hook displacable from the hook receptacle with a pushing action of the recycling tool configured to unlock the enclosure.

9. The method of claim 1, further comprising:
fastening each of one or more of the following components to the enclosure configured to allow for rapid demanufacturing using a hook-and-loop fastener: the motherboard, the display, one or more batteries configured to power the motherboard, a wireless power receiver configured to charge the one or more batteries, a shielding enclosure, an input/output device, a hard drive, and a memory.

10. The method of claim 1, wherein the electronic device is one of a laptop computer, a smart phone, a tablet, a camera, an Internet of Things device, a television, a gaming device, and a smart watch.

11. A method for demanufacturing an electronic device in order to minimize an environmental impact and to facilitate the repair, refurbishing, or recycling of the electronic device, the method comprising:
- providing a motherboard and a display configured to manufacture the electronic device;
- attaching and enclosing the motherboard and the display to an enclosure having a top portion and a bottom portion and one or more side walls joining the top and the bottom portions, at least one of the motherboard and the display attaching to the enclosure by one or more guides of the enclosure and slidably removable at an end-of-life of the electronic device;
- disposing at least one locking mechanism on one of the one or more side walls, the at least one locking mechanism configured to release with one action of a recycling tool inserted into the at least one locking mechanism;
- locking the top portion to the bottom portion with the at least one locking mechanisms, thereby completing the enclosing; and
- making available demanufacturing instructions configured to provide disassembly steps to disassemble the electronic device into separate components and the recycling tool for the demanufacturing of the device.

12. The method of claim 11, wherein:
where the one or more guides comprise a guide rail or guide tabs.

13. The method of claim 11, further comprising:
accessing an application server from a communications device of an operator of the electronic device, the communications device having a processor for operating an end-of-life application installed on the processor and providing internet connectivity to the application server, the end-of-life application capable of one or both of driving a user interface configured to assess a set of demanufacturing instructions configured to provide disassembly steps to disassemble the electronic device into separate components.

14. The method of claim 11, further comprising:
providing one or more batteries within the enclosure for powering the motherboard and further comprising a wireless power receiver connectable to the one or more batteries for charging from an RF source remote from the electronic device.

15. A method for exchanging one or more components of an end-of-life electronic device between a device operator owning or operating the electronic device and a network of entities in order to recycle device scrap or to extend the life of the electronic device, the method comprising:
- initiating a logical session between the device operator and an application server;
- receiving from the device operator a request to provide information on the one or more components of the end-of-life electronic device;
- accessing databases connected to the application server to retrieve the information on one or more components of the end-of-life electronic device arriving from at least one entity communicative with the application server, the databases connected to the application server include demanufacturing instructions configured to provide disassembly steps to disassemble the electronic device into separate components; and
- transmitting the demanufacturing instructions to the device operator.

16. The method of claim 15, further comprising:
communicating between the device operator and the entity communicative with the server configured to exchange the one or more components of the end-of-life electronic device.

17. The method of claim 16, further comprising:
the application server configured to transact funds to the entity communicative with the application server to complete the exchange of the one or more components.

18. The method of claim 15, wherein:
the entities communicative with the application server include at least one of an OEM supplier and other device operators.

* * * * *